(12) United States Patent
Baldassarre et al.

(10) Patent No.: US 11,692,452 B2
(45) Date of Patent: Jul. 4, 2023

(54) COMPRESSOR TRAIN START-UP USING VARIABLE INLET GUIDE VANES

(71) Applicant: NUOVO PIGNONE TECNOLOGIE SRL, Florence (IT)

(72) Inventors: Leonardo Baldassarre, Florence (IT); Antonio Pelagotti, Florence (IT); Marco Pelella, Florence (IT); Nicola Marcucci, Florence (IT); Fabio Baldanzini, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 144 days.

(21) Appl. No.: 16/070,492

(22) PCT Filed: Jan. 23, 2017

(86) PCT No.: PCT/EP2017/051319
§ 371 (c)(1),
(2) Date: Jul. 16, 2018

(87) PCT Pub. No.: WO2017/129518
PCT Pub. Date: Aug. 3, 2017

(65) Prior Publication Data
US 2019/0024528 A1     Jan. 24, 2019

(30) Foreign Application Priority Data

Jan. 25, 2016    (IT) .................. 102016000006952

(51) Int. Cl.
*F01D 15/08*      (2006.01)
*F04D 27/02*      (2006.01)
(Continued)

(52) U.S. Cl.
CPC ............. *F01D 15/08* (2013.01); *F01D 19/00* (2013.01); *F02C 7/26* (2013.01); *F02C 9/20* (2013.01);
(Continued)

(58) Field of Classification Search
CPC .. F01D 15/08; F01D 19/00; F02C 7/26; F02C 9/20; F02C 7/057; F02C 7/262;
(Continued)

(56) References Cited

U.S. PATENT DOCUMENTS 3,891,915 A * 6/1975 Yannone ................... F02C 7/26
                                                  322/15
3,901,620 A * 8/1975 Boyce ..................... F04D 27/02
                                                   415/1
(Continued)

FOREIGN PATENT DOCUMENTS

CN    104956036 A    9/2015
CN    106015064 A    10/2016
(Continued)

OTHER PUBLICATIONS

Italian Search Report and Opinion issued in connection with corresponding IT Application No. 102016000006952 dated Oct. 14, 2016.
(Continued)

*Primary Examiner* — Devon C Kramer
*Assistant Examiner* — Joseph S. Herrmann
(74) *Attorney, Agent, or Firm* — Baker Hughes Patent Organization

(57) ABSTRACT

A method for operating start-up of a compressor train is disclosed. The train includes a driver machine and at least a centrifugal compressor drivingly coupled to the driver machine. The centrifugal compressor in turn includes a plurality of compressor stages and at least a first set of (Continued)

variable inlet guide vanes at an inlet of one of the compressor stages. The method includes at least partly closing the first set of variable inlet guide vanes; when the first set of variable inlet guide vanes is at least partly closed, starting rotation of the centrifugal compressor and accelerating the centrifugal compressor up to a minimum operating speed; opening the at least one set of variable inlet guide vanes to increase the gas flow through the centrifugal compressor once the minimum operating speed has been achieved.

10 Claims, 11 Drawing Sheets

(51) Int. Cl.
  *F04D 29/46* (2006.01)
  *F02C 9/20* (2006.01)
  *F02C 7/26* (2006.01)
  *F01D 19/00* (2006.01)

(52) U.S. Cl.
  CPC ....... *F04D 27/0246* (2013.01); *F04D 29/462* (2013.01); *F05D 2260/85* (2013.01)

(58) Field of Classification Search
  CPC .......... F02C 9/16; F02C 9/54; F04D 27/0246; F04D 27/002; F04D 29/462; F04D 27/0207; F04D 27/0215; F04D 27/0223; F04D 27/009; F05D 2260/85; F25J 1/0279; F25J 1/029; F25J 2230/20; F25J 2230/22
  USPC .......................................... 417/251, 253, 299
  See application file for complete search history.

(56) References Cited

U.S. PATENT DOCUMENTS

| | | | | |
|---|---|---|---|---|
| 4,057,371 A | | 11/1977 | Pilarczyk | |
| 4,077,748 A | * | 3/1978 | Potz | F02C 6/16 417/319 |
| 4,388,585 A | * | 6/1983 | Nola | H02J 3/40 322/29 |
| 4,611,969 A | * | 9/1986 | Zinsmeyer | F04D 29/464 415/1 |
| 4,783,026 A | * | 11/1988 | Rumford | B64D 15/04 244/134 B |
| 4,807,150 A | * | 2/1989 | Hobbs | F04D 27/0207 700/282 |
| 4,916,893 A | | 4/1990 | Rodgers | |
| 5,224,337 A | * | 7/1993 | Morishita | F02C 9/20 60/773 |
| 5,748,500 A | | 5/1998 | Quentin et al. | |
| 6,402,482 B1 | * | 6/2002 | Lee | F01D 15/08 417/243 |
| 6,817,186 B2 | * | 11/2004 | Tanaka | F01K 23/101 60/39.182 |
| 9,074,606 B1 | | 7/2015 | Moore | |
| 9,353,765 B2 | * | 5/2016 | Haley | F04D 29/462 |
| 9,714,658 B2 | * | 7/2017 | Miyata | F25J 3/04957 |
| 9,835,196 B2 | * | 12/2017 | Baldassarre | F16C 17/02 |
| 10,364,826 B2 | * | 7/2019 | Sishtla | F04D 29/442 |
| 10,625,817 B2 | | 4/2020 | Kishita et al. | |
| 2010/0293967 A1 | * | 11/2010 | Liskow | F02C 3/103 62/6 |
| 2014/0000272 A1 | | 1/2014 | Fichtner et al. | |
| 2014/0161588 A1 | * | 6/2014 | Miyata | F04D 27/002 415/17 |
| 2014/0341710 A1 | * | 11/2014 | Creamer | F04D 27/007 415/203 |
| 2014/0373551 A1 | * | 12/2014 | Kraft | F02C 7/08 60/772 |
| 2015/0285089 A1 | | 10/2015 | Scarponi et al. | |
| 2016/0040927 A1 | * | 2/2016 | Pelagotti | F04D 25/163 62/613 |

FOREIGN PATENT DOCUMENTS

| | | | | |
|---|---|---|---|---|
| GB | 1374871 | * | 11/1974 | |
| GB | 1374871 A | | 11/1974 | |
| JP | S56165798 A | | 12/1981 | |
| JP | S608499 A | | 1/1985 | |
| JP | H04370397 A | | 12/1992 | |
| JP | H09119396 A | | 5/1997 | |
| JP | 2006183465 A | | 7/2006 | |
| JP | 2007309154 A | | 11/2007 | |
| JP | 2016519277 A | | 6/2016 | |
| JP | 2016180400 A | | 10/2016 | |
| JP | 2018043662 A | | 3/2018 | |
| WO | 88/05125 A1 | | 7/1988 | |
| WO | WO-2014154629 A1 | * | 10/2014 | ........... F04D 29/542 |

OTHER PUBLICATIONS

International Search Report and Written Opinion issued in connection with corresponding PCT Application No. PCT/EP2017/051319 dated Mar. 10, 2017.

International Preliminary Report on Patentability issued in connection with corresponding PCT Application No. PCT/EP2017/051319 dated Jul. 31, 2018.

* cited by examiner

COMPRESSOR TRAIN START-UP USING VARIABLE INLET GUIDE VANES

TECHNICAL FIELD

Embodiments of the invention relate to centrifugal compressor trains comprising one or more centrifugal compressors and a driver machine. Embodiments disclosed herein concern methods and systems for operating the start-up of centrifugal compressor trains.

BACKGROUND OF THE INVENTION

Centrifugal compressors are used in several industrial applications to boost the pressure of process gas. In the field of oil and gas, for instance, centrifugal compressors are used to process refrigerant fluids in plants for liquefaction of natural gas (LNG plants). Refrigerant fluids, such as mixed refrigerant, propane and the like, are used in such plants to remove heat from a flow of natural gas which is extracted from a gas field to chill and liquefy the natural gas for transportation purposes. The centrifugal compressors are driven by a driver, which may include an electric motor or a gas turbine engine, for instance.

Single shaft gas turbine engines operating at quasi-fixed speed and fixed-speed electric motors have a reduced torque capability at start-up, which causes problems when the centrifugal compressor train must be started up following shut down, from pressurized conditions. The startup suction density can be much higher than the nominal one, and could cause startup issues also when variable speed drivers are employed, such as aero-derivative gas turbine engines, steam turbines and variable speed electric motors. In such situations, even if the driver has a nominal torque capability from low speed, the startup torque can be higher than the nominal torque, causing failure of the startup sequence.

The fluid circuit, whereof the centrifugal compressor train forms part, shall be emptied, or the amount of fluid therein shall be reduced, in order to limit the torque required to start-up the turbomachine. Emptying and subsequently refilling the fluid circuit is a time consuming and expensive operation.

A need therefore exists, for improvement of plants and systems involving centrifugal compressors, aimed at alleviating or solving drawbacks of the systems of the current art, especially arising at start-up.

SUMMARY OF THE INVENTION

According to a first aspect, a method for operating start-up of a compressor train is disclosed herein. The compressor train comprises a driver machine and at least a centrifugal compressor drivingly coupled to the driver machine. The centrifugal compressor is a further machine and not a part of the driver machine. The centrifugal compressor in turn comprises a plurality of compressor stages and at least a first set of variable inlet guide vanes (herein after shortly also IGVs) at an inlet of one of said compressor stages. The method comprises the following steps:

at least partly closing the first set of variable inlet guide vanes;
starting rotation of the centrifugal compressor and accelerating the centrifugal compressor up to a minimum operating speed, while the variable inlet guide vanes are at least partly closed;
opening the at least one set of variable inlet guide vanes to increase the gas flow through the centrifugal compressor once the minimum operating speed has been achieved.

According to some embodiments, the minimum operative speed can be the minimum allowable speed of the machine. The minimum allowable speed can be defined according to API 617 standard for "Axial and Centrifugal Compressors and Expander-Compressors for Petroleum, Chemical and Gas Industry Services". The API 617 standard defines the minimum allowable speed as the lowest speed (in rpm) at which the manufacturer's design will permit continuous operation.

When the driver machine is an electric motor, the minimum operating speed can be the rated speed or the synchronization speed (i.e. the speed of synchronization of the electric motor to the electric grid frequency).

The partly closed inlet guide vanes reduce the gas flow through the compressor and thus the torque required to drive the compressor. A larger torque margin is available to accelerate the centrifugal compressor.

The variable inlet guide vanes can be arranged at the inlet of the most upstream one of the compressor stages. In some embodiments, additional variable inlet guide vanes can be arranged at the inlet side of one or more additional compressor stages. For instance, the compressor may have a back-to-back configuration, with variable inlet guide vanes at the inlet of the first (i.e. the most upstream one) compressor stage of each one group of compressor stages in back-to-back arrangement. This makes the configuration of the compressor particularly simple and affordable.

While according to some embodiments the step of at least partly closing the first set of variable inlet guide vanes can be performed prior to starting rotation of the centrifugal compressor, according to other embodiments, rotation of the compressor can be initiated prior to closing the variable inlet guide vanes. These latter are closed timely, once rotation has started and prior to reaching a steady state rotary speed, for instance, such that the torque margin does not drop under unacceptable values.

In some embodiments the driver machine comprises a single-shaft gas turbine engine and a starter. During the step of starting rotation of the centrifugal compressor and accelerating the centrifugal compressor, power generated by the starter is applied to the centrifugal compressor through the single shaft of the gas turbine engine.

According to a further aspect, disclosed herein is a gas compressor train comprising a centrifugal compressor comprised of a compressor inlet, a compressor outlet, a plurality of compressor stages sequentially arranged between the compressor inlet and the compressor outlet, and at least a first set of variable inlet guide vanes at an inlet of one of said compressor stages. The compressor train further comprises a driver machine drivingly coupled to the centrifugal compressor, and a controller, configured and arranged for at least partly closing the set of variable inlet guide vanes during a start-up and acceleration step of the centrifugal compressor.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of embodiments of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
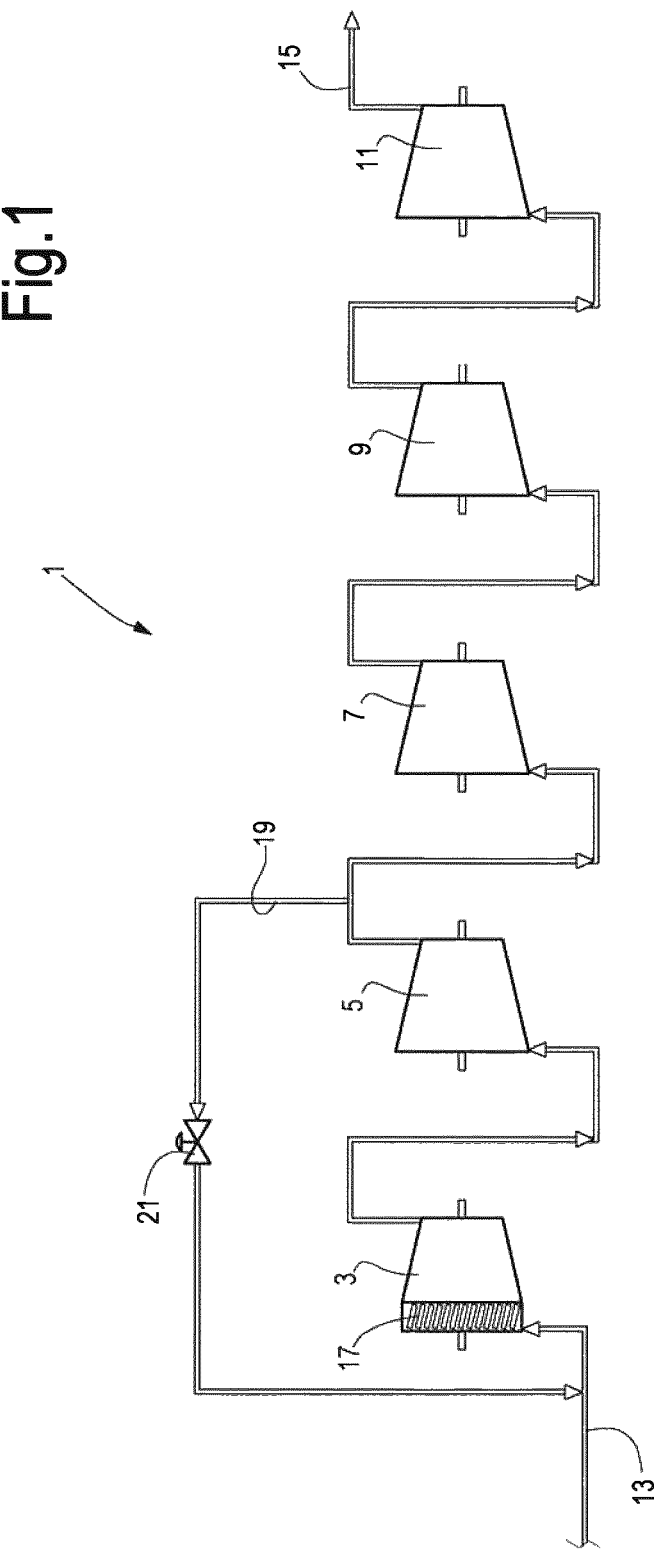
FIG. 1 illustrates a schematic of a multi-stage centrifugal compressor system according to embodiments described herein.
Figure 2:
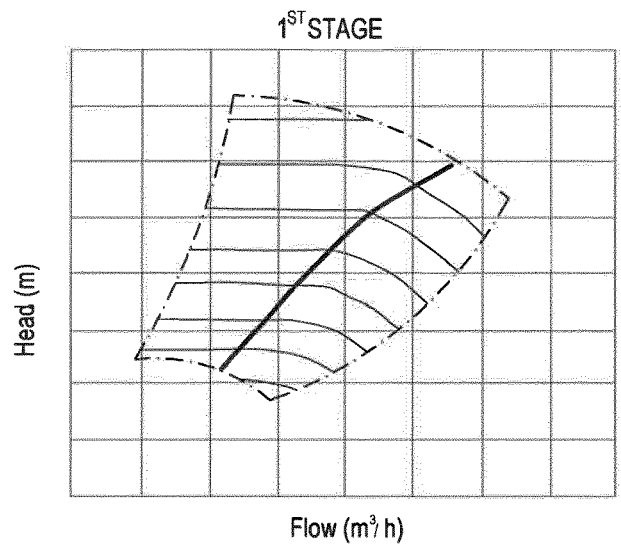
FIGS. 2 to 6 illustrate head curves of the compressor stages of FIG. 1 showing the variation of the head across the compressor stages vs. the process gas flow at start up with fully opened IGVs.
Figure 3:
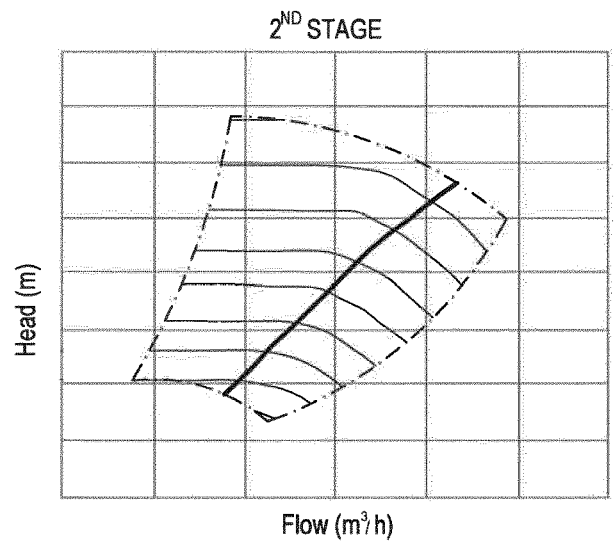
Figure 4:
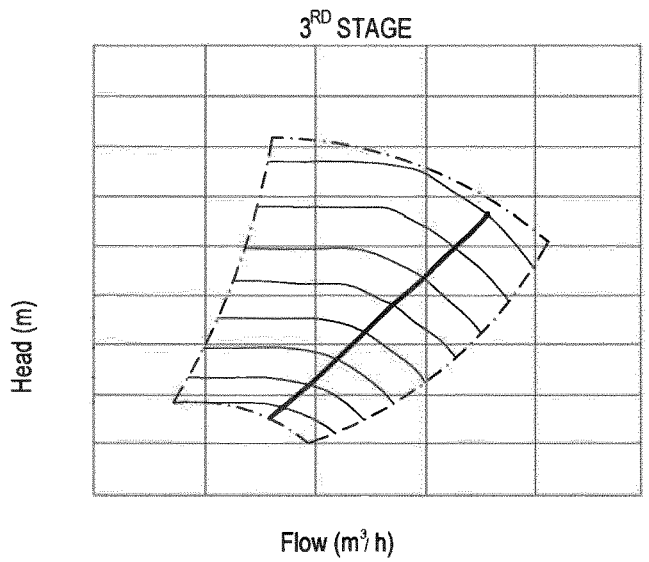
Figure 5:
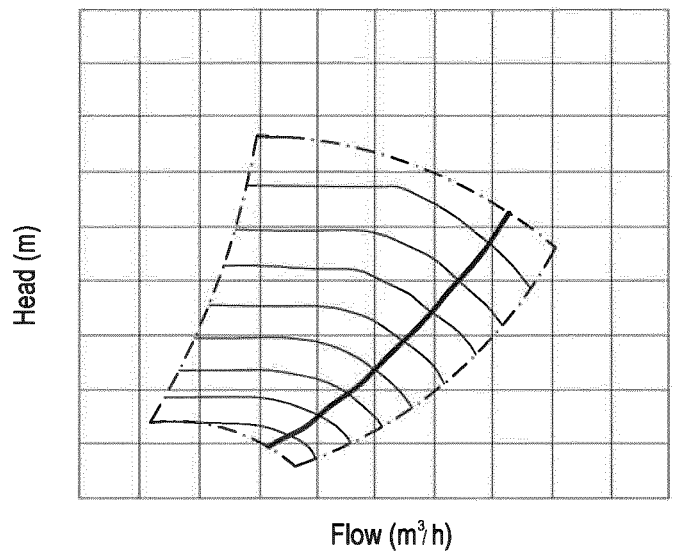
Figure 6:
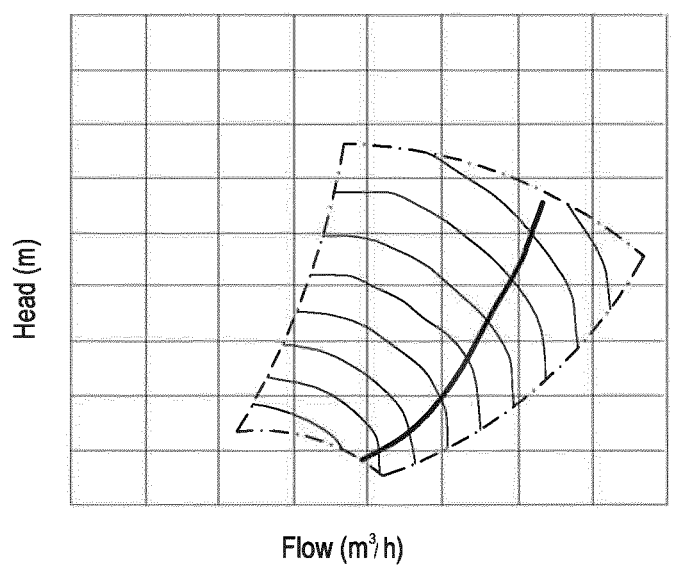

FIG. 1 schematically illustrates a multi-stage centrifugal compressor 1 comprising a plurality of stages 3, 5, 7, 9, 11. The stages of compressor 1 are shown as separate units for the sake of clarity. It shall however be understood that the compressor stages 3 to 11 can be arranged in one and the same compressor casing having a compressor suction side (or compressor inlet) 13 and a compressor delivery side (or compressor outlet) 15. The multi-stage centrifugal compressor 1 can be driven into rotation by a driver machine, not shown in FIG. 1. The driver machine may include an electric motor. In some embodiments, a variable speed coupling, such as a variable speed planetary gear, can be arranged between a fixed speed electric motor and the compressor 1.

In other embodiments, the driver machine may include a gas turbine engine. In some exemplary embodiments, the driver machine includes a single-shaft gas turbine engine. In combination with a gas turbine engine, the driver machine can comprise a starter, for example an electric machine operating as a motor to start up the compressor train.

The multi-stage centrifugal compressor 1 can be one of a plurality of refrigerant compressors of an LNG plant. For instance, the multi-stage centrifugal compressor 1 can be a mixed refrigerant compressor or a propane compressor. The multi-stage centrifugal compressor 1 compresses the refrigerant fluid from a suction pressure to a delivery pressure and circulates the refrigerant fluid in a closed refrigerant circuit. The compressed refrigerant fluid is then expanded in an expander or in an expansion valve arrangement, to reduce the temperature thereof. The chilled expanded refrigerant fluid is placed in heat exchange relationship with a flow of natural gas to be chilled and liquefied, to remove heat from a natural gas flow and is subsequently cooled by heat exchange with a heat sink, prior to be processed again by the multi-stage centrifugal compressor 1.

One, some or all the centrifugal compressor stages 3-9 can be provided with variable inlet guide vanes. In the schematic embodiment of FIG. 1, variable inlet guide vanes (IGVs) are illustrated at the inlet of first centrifugal compressor stage 3 and are schematically shown at 17.

One or more bleed lines, i.e. by-pass lines, can be provided, fluidly connecting the delivery side of one compressor stage to the suction side of another upstream compressor stage. In the exemplary embodiment of FIG. 1 a bleed line 19 is shown, which fluidly couples the delivery side of compressor stage 5 to the suction side 13 of the compressor, i.e. the suction side of the first compressor stage 3. A bleed valve 20 can be arranged on the bleed line 19, for controlling the amount of bled process gas flowing through the bleed line 19.

The operating conditions of the multi-stage centrifugal compressor 1 can be controlled by acting upon the variable inlet guide vanes 17. These latter can be acted upon to modify the gas flow rate through the multi-stage centrifugal compressor 1, for instance.

Figure 7:
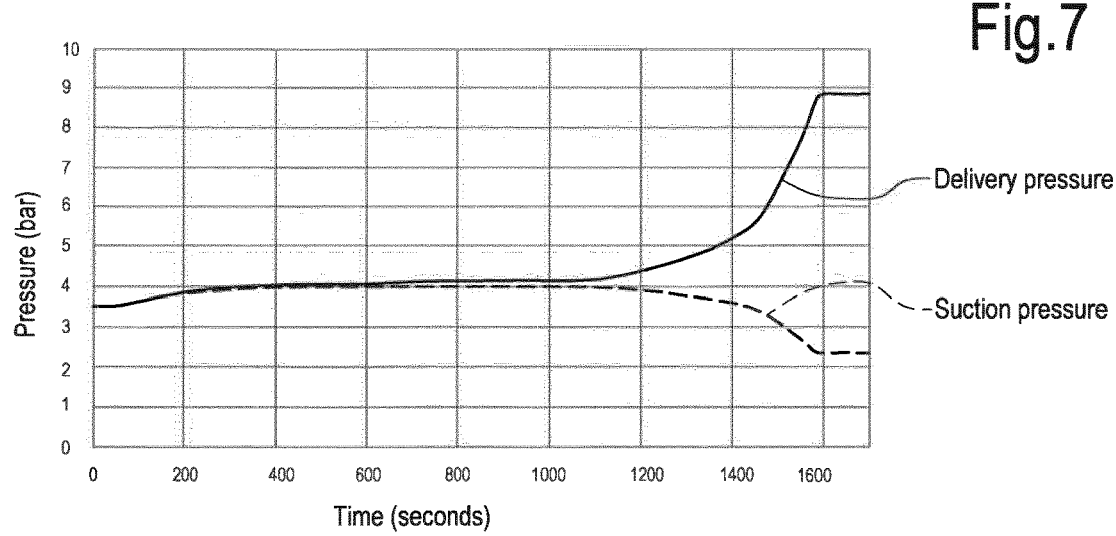
FIG. 7 illustrates a pressure-vs.-time diagram at start-up of the compressor system of FIG. 1 operated at fully opened IGVs.

FIGS. 2 to 6 illustrate compressor curve profiles for the five stages 3 to 11 when the multi-stage centrifugal compressor 1 is run with entirely open IGVs 17. Each diagram of FIGS. 2 to 6 illustrates the head-vs.-flowrate curve for a respective one of the five stages of the multi-stage centrifugal compressor 1. FIG. 7 illustrates the suction side pressure and the delivery side pressure of the multi-stage centrifugal compressor 1 as a function of time under the same operating conditions at start-up, when the fluid circuit, whereof the multi-stage centrifugal compressor 1 forms part, is filled with process gas. The multi-stage centrifugal compressor 1 is started at time t=0.

Figure 8:
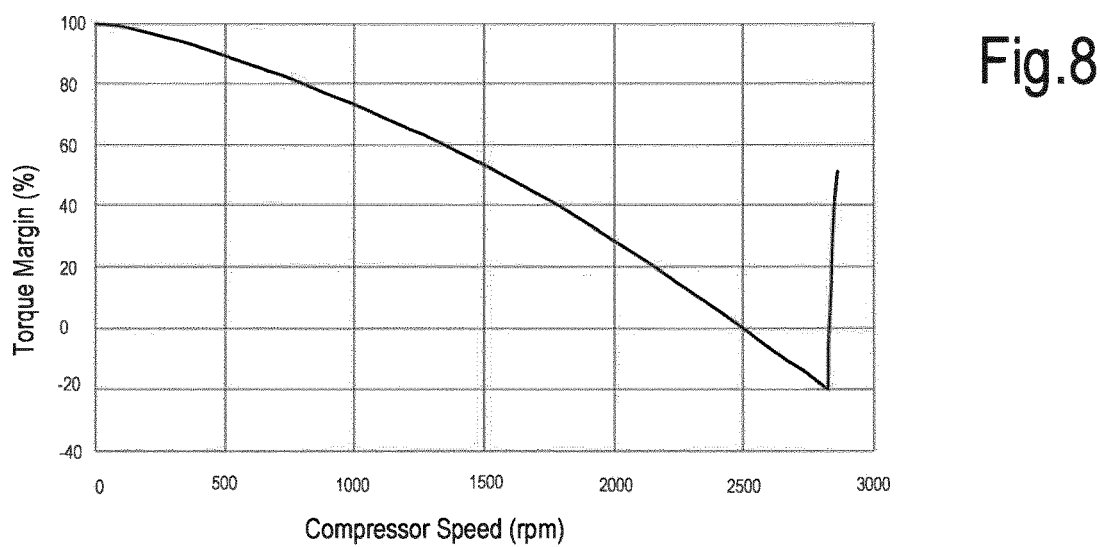
FIGS. 8 and 9 illustrate the torque margin and the fluid torque of the compressor system operated under the conditions of FIGS. 2 to 7.

FIG. 8 illustrates the torque margin (in %) as a function of the compressor speed, starting from zero speed. The torque margin is the percentage of available torque from the driver machine. For a correct operation of the compressor train at start up, said torque margin shall be greater than zero, to guarantee compressor train acceleration according to the driver machine speed schedule required by the driver machine manufacturer.

Figure 9:
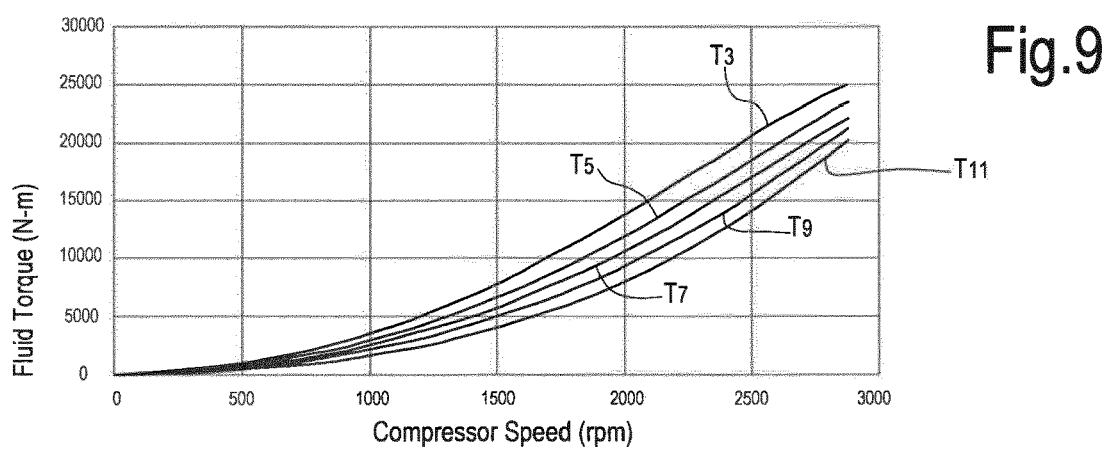
Figure 10:
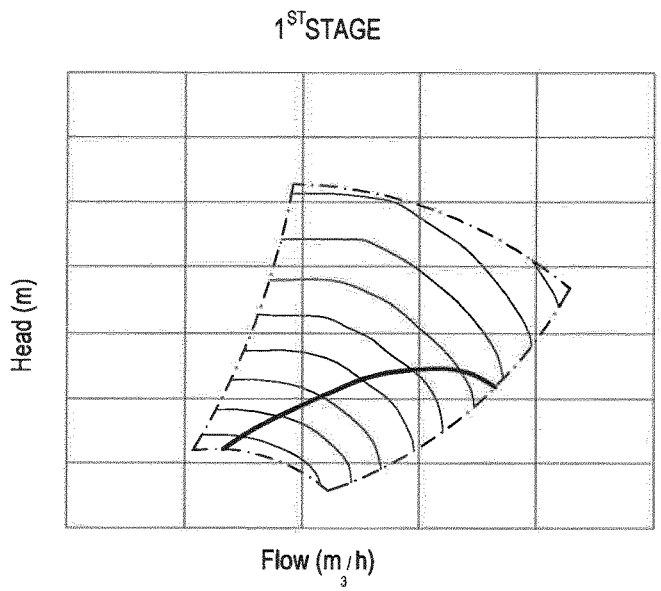
FIGS. 10 to 17 illustrate the same curves of diagrams in FIGS. 2 to 9 when the compressor system is operated with partly closed IGVs at start up.
Figure 11:
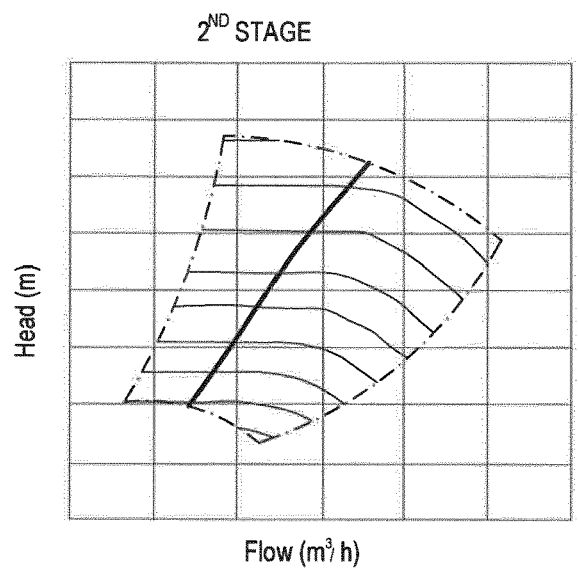
Figure 12:
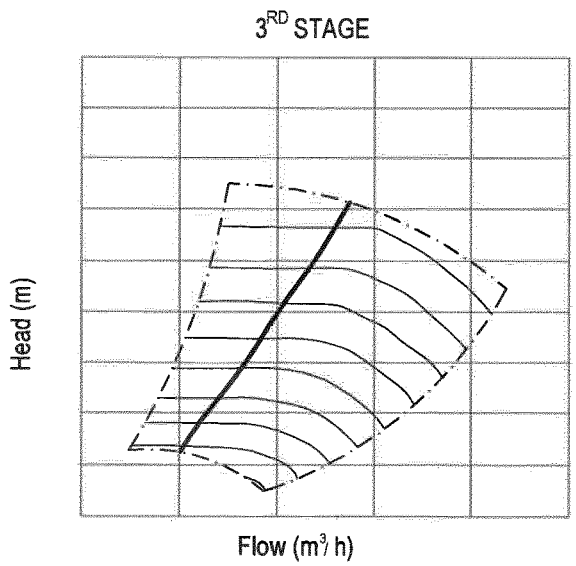
Figure 13:
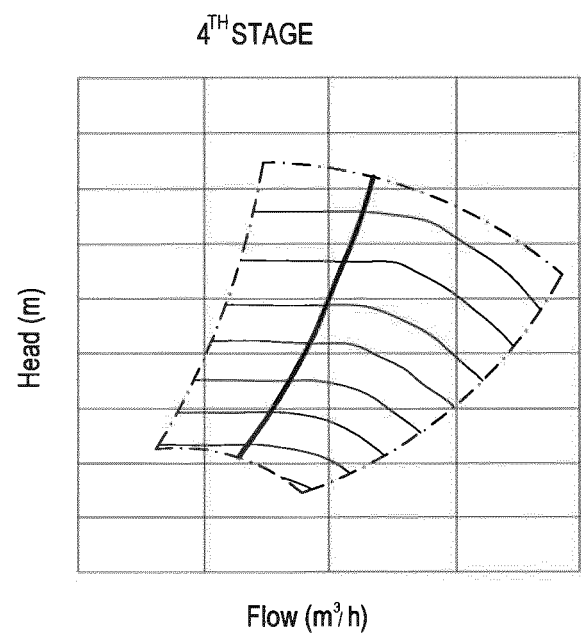
Figure 14:
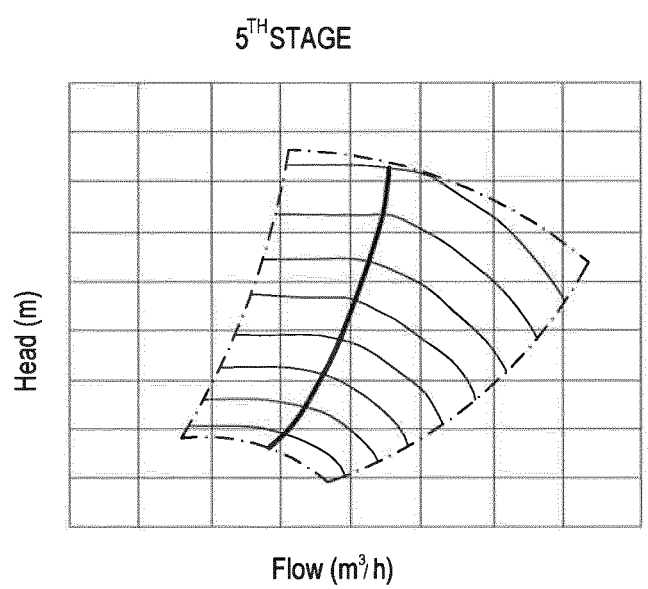
Figure 15:
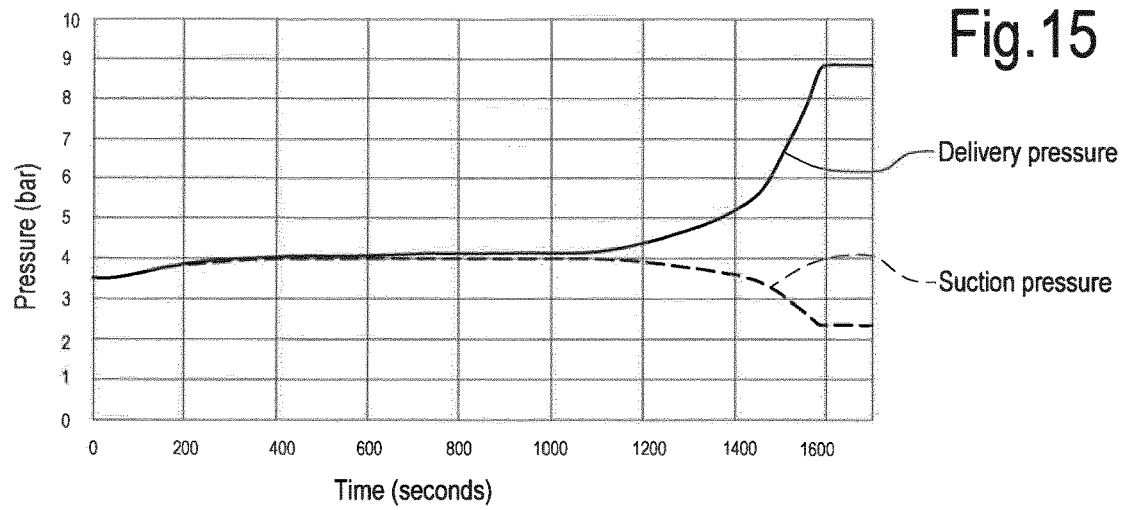
Figure 16:
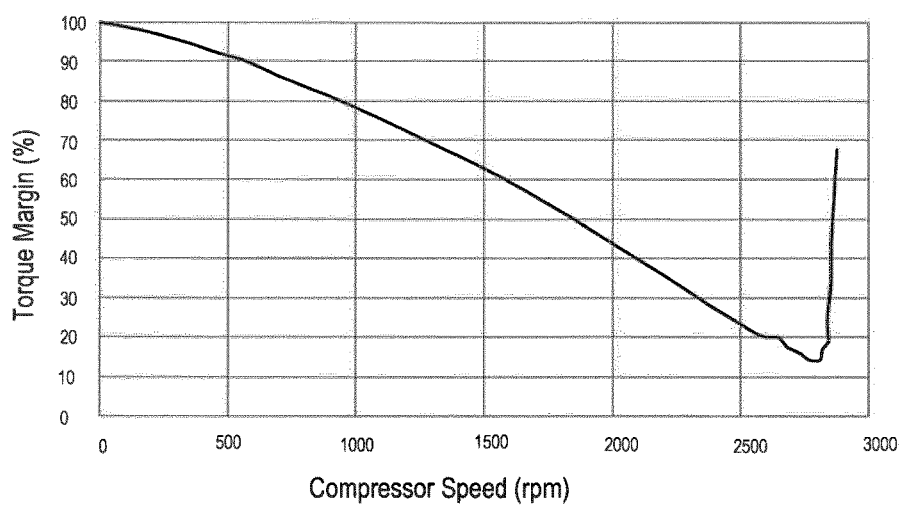

FIG. 9 illustrates the fluid torque vs. compressor speed for the five compressor stages 3-11. Curves T3, T5, T7, T9, T11 represent the torque absorbed by stages 3, 5, 7, 9, 11, respectively.

As can be seen from FIG. 8, if the multi-stage centrifugal compressor 1 is started up with fully opened IGVs and completely filled compressor circuit, the torque margin drops under 0 at a given compressor speed. Start-up of the multi-stage centrifugal compressor 1 thus requires the compressor circuit to be at least partly emptied prior to start-up. Alternatively, an over-dimensioned driver machine shall be used, just to provide sufficient torque at start-up. Alternatively, other devices such as inlet throttling valves (arranged in the anti-surge loop) might be taken into account to lower the absorbed torque over the compressor start up. If the driver machine is an electrical motor, an over-sized electric motor, having a power rate greater than the one required for driving the compressor train under steady state conditions is required just to cope with the large torque requirements at start-up.

If the driver machine includes a single-shaft gas turbine engine, a separate starter, such as an electric motor or else a steam turbine, is required to start up the multi-stage centrifugal compressor 1. In such case, the rated power of the starter shall be dimensioned such that sufficient torque is available at start-up. The cost and dimension of the starter become overly high. Additionally, the high power rate provided by the starter cannot be transmitted through the shaft of the gas turbine engine, such that the starter shall be arranged on the end of the shaft line of the compressor train opposite the gas turbine engine. This causes drawbacks in terms of accessibility to the turbomachines and causes problems during maintenance of the centrifugal compressor(s) of the compressor train.

According to some embodiments of the subject matter disclosed herein, to reduce the torque margin drop, and thus cope with the required torque and power at start-up with a less performing starter, the variable IGVs 17 of multi-stage centrifugal compressor 1 are at least partly closed at start-up. This causes a reduction of the process gas flow across the multi-stage centrifugal compressor 1 and consequently a reduction of the torque required driving the multi-stage centrifugal compressor 1 into rotation.

FIGS. 10 to 17 illustrate the same diagrams as FIGS. 2 to 9 when start-up of the multi-stage centrifugal compressor 1 is operated at partly closed IGVs 17. Since the IGVs 17 are arranged at the inlet of the first compressor stage 3, the head curve of the first stage 3 (FIG. 10) achieves a maximum for a given process fluid flow, followed by a decrease.

In terms of torque margin, this is reflected in a minimum torque margin at a given compressor speed (see FIG. 16), followed by an increase of the torque margin, such that the torque margin never drops below approximately 14% in the example shown. The mass flow across the compressor stage is substantially reduced.

Figure 17:
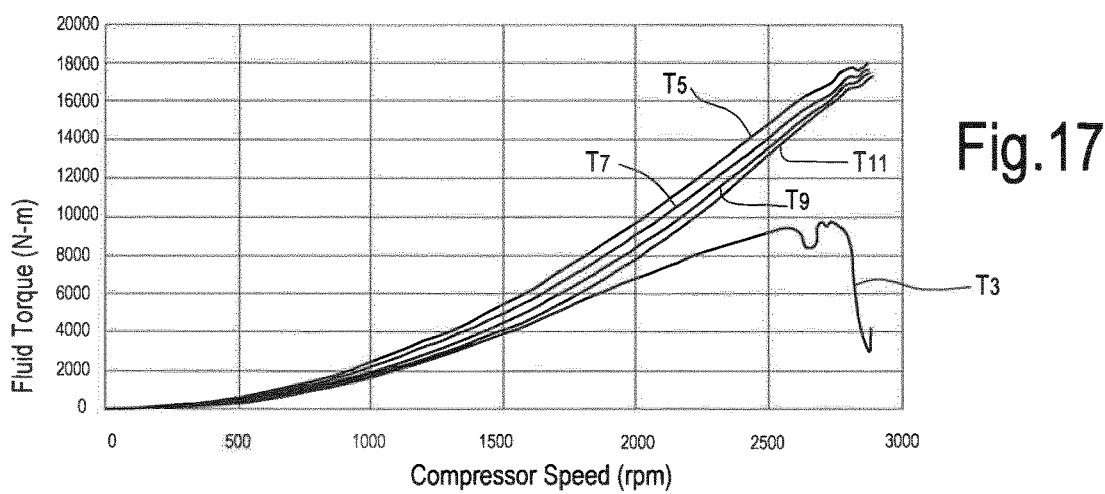
Figure 18:
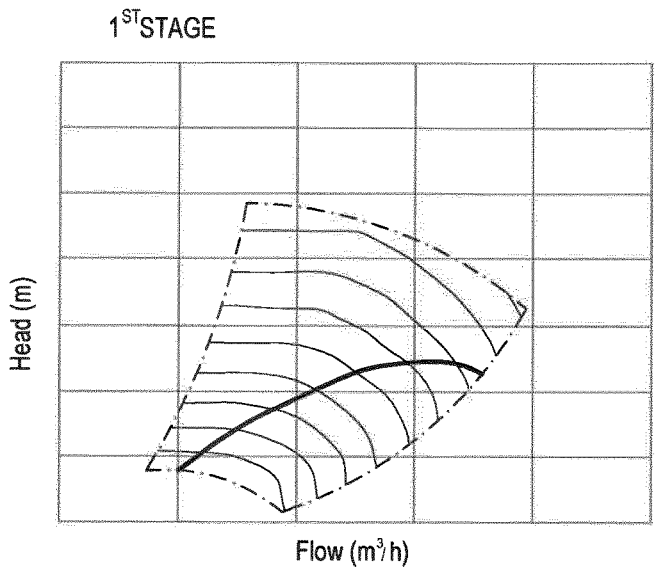
FIGS. 18 to 25 illustrate the same diagrams of FIGS. 2 to 9 when the compressor system is operated with partly closed IGVs and gas bleeding from second to first stage at start up.
Figure 19:
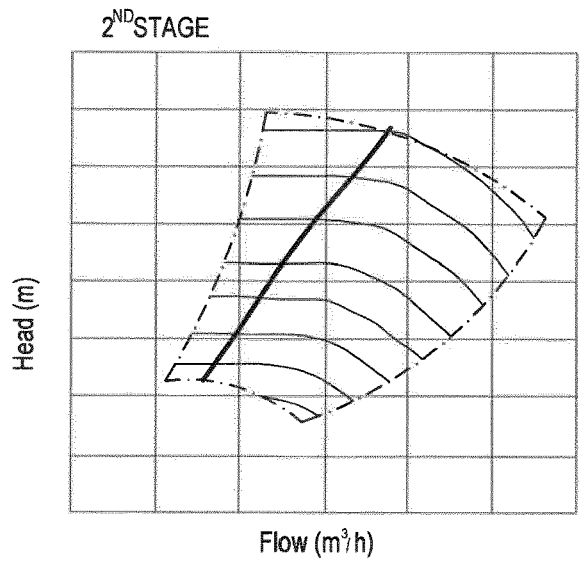
Figure 20:
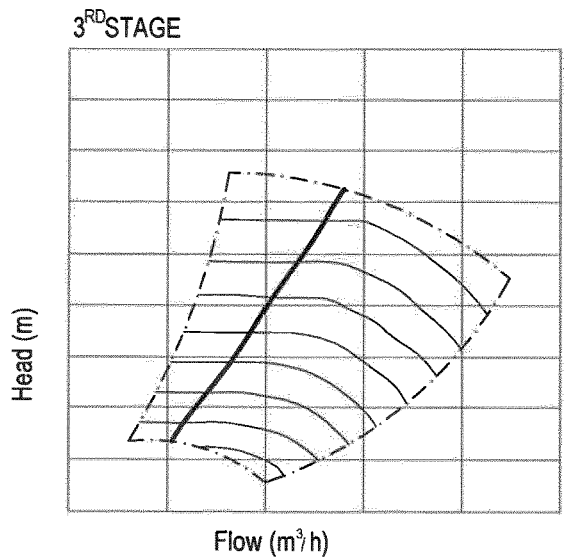
Figure 21:
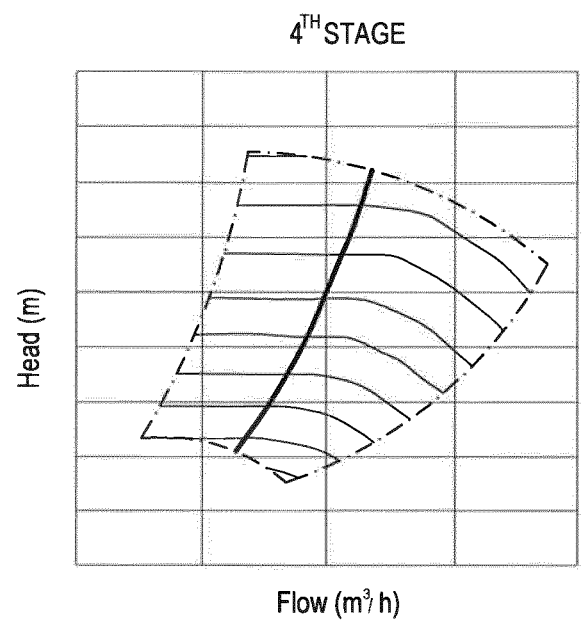
Figure 22:
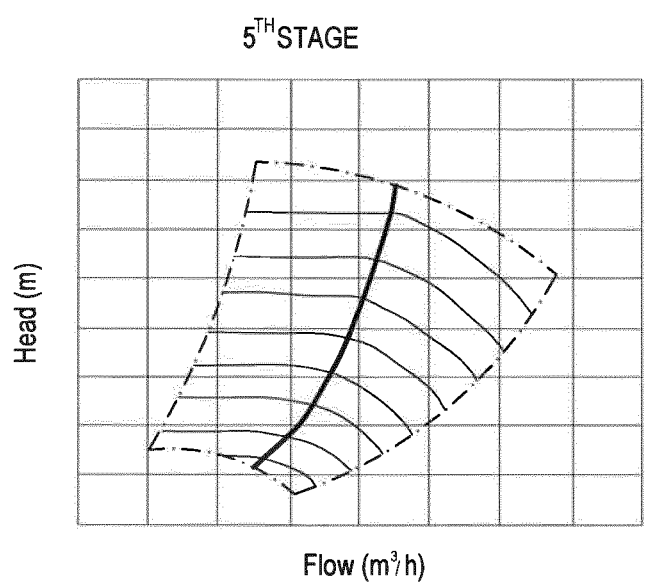
Figure 23:
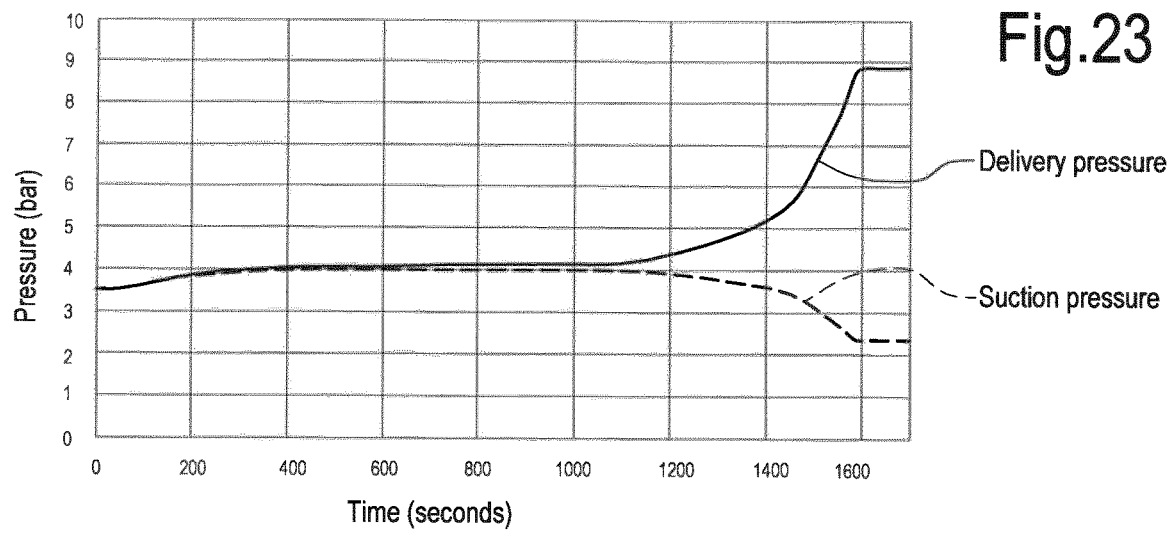
Figure 24:
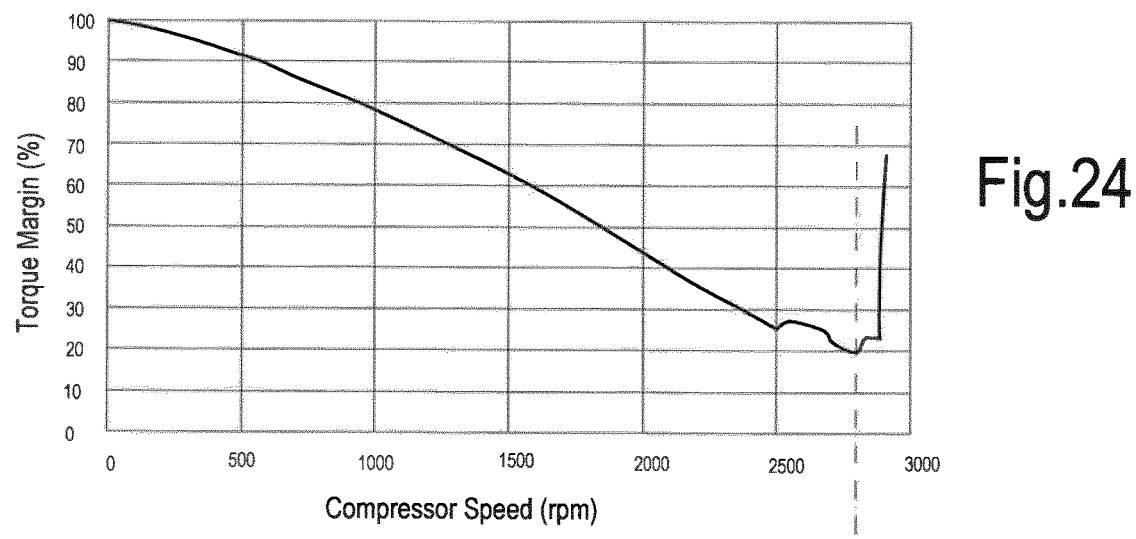
Figure 25:
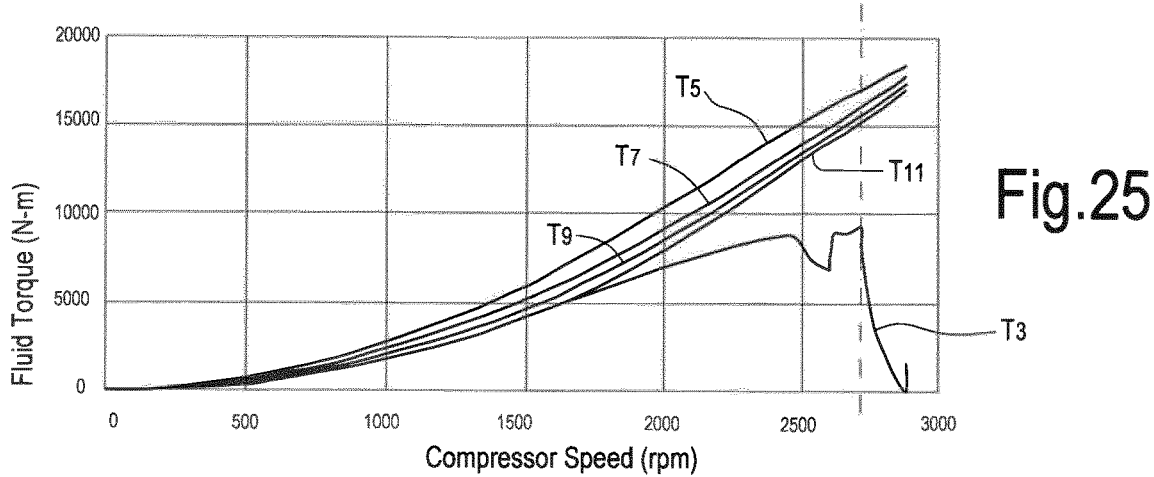

FIG. 17 illustrates the torque absorbed by each one of the five stages 3-11 of the multi-stage centrifugal compressor 1. By closing the variable IGVs 17, the torque absorbed by the first stage 3 is reduced with respect to the torque absorbed in the operation conditions depicted in FIG. 9 and achieves a maximum at a given compressor speed. Beyond said compressor speed value, the torque drops, thus causing an increase of the torque margin (see FIG. 16). It shall be noted that also the absolute torque of the second and subsequent stages is reduced, due to the density reduction of the gas downstream of the first stage.

Additional benefits in terms of torque reduction can be achieved by bleeding part of the process gas from one of the compressor stages back to the suction side of an upstream compressor stage. In the embodiment of FIG. 1 the bleed line 19 is arranged between the delivery side of the second compressor stage 5 and the suction side of the first compressor stage 3. By bleeding a percentage of the process gas flow from the delivery side of compressor stage 5 to the suction side of the compressor stage 3, the head curve of the first compressor stage 3 will further drop by increasing flow rate, thus reducing the total torque absorbed by the multi-stage centrifugal compressor 1.

FIGS. 18 to 25 illustrate the same diagrams as FIGS. 10 to 17, with an additional process gas bleed. As can be appreciated in particular by comparing FIGS. 24 and 25 with FIGS. 16 and 17, the torque margin will in this case not drop below 20% and the torque absorbed by the first stage 3 can become zero.

The torque reduction at start-up is achieved by reducing the process fluid flow acting upon the variable IGVs 17. In embodiments, the variable IGVs 17 are closed prior to starting rotation of the multi-stage centrifugal compressor 1. However, this is not strictly necessary. In fact, as shown by the head curves of FIGS. 2, 10, 18 and FIGS. 8, 16, 24, the head increases gradually and the torque margin drops gradually upon starting the multi-stage centrifugal compressor 1. It would thus be possible to initiate the start-up procedure with fully open IGVs 17 and to gradually close the IGVs 17 to limit the head increase and the torque margin drop.

The variable IGVs 17 can be re-opened once the multi-stage centrifugal compressor 1 has achieved a minimum operative speed. In case of a turbomachine train operating at fixed or quasi-fixed speed, the minimum operative speed can be the rated speed of the driver machine. In some embodiments, the minimum operative speed can be set as the minimum allowable speed under API 617 standard (see API 617 standard, 2002 edition, paragraph 1.5.22).

Figure 26:
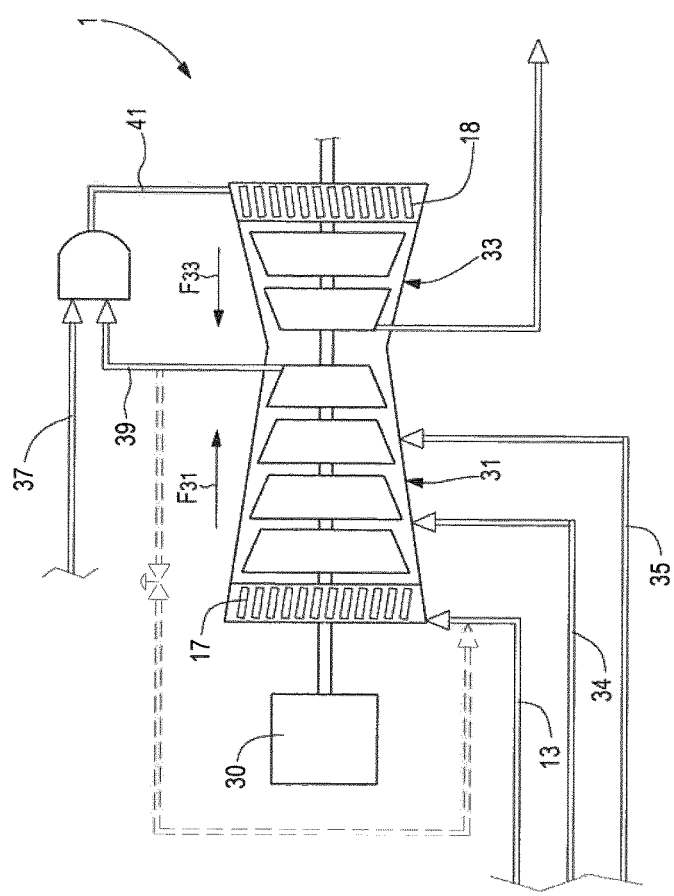
FIG. 26 illustrates a schematic of a further embodiment of a multi-stage centrifugal compressor system according to the present disclosure.

FIG. 26 illustrates a further exemplary embodiment of a multi-stage centrifugal compressor 1. In the schematic of FIG. 26 a driver machine 30 is shown, which can be comprised of an electric motor and/or of a gas turbine engine, more particularly, a single-shaft gas turbine engine.

In the illustrated embodiment the multi-stage centrifugal compressor 1 comprises a first set 31 of compressor stages and a second set 33 of compressor stages, in a back-to-back arrangement. The gas flow in the first set 31 of compressor stages is generally in the direction of arrow F31, while the gas flow in the second set 33 of compressor stages is generally in the direction of arrow F33. The delivery side of the most downstream compressor stage of the first set 31 is fluidly coupled to the suction side of the most upstream compressor stage of the second set 33.

In some embodiments, a first set of variable inlet guide vanes 17 is arranged at the suction side of the multi-stage centrifugal compressor 1, and a second set of variable inlet guide vanes 18 is arranged at the suction side of the most upstream compressor stage of the second set 33 of compressor stages. One or both sets of variable inlet guide vanes 17, 18 can be controlled to reduce the process gas flow at start-up, thus reducing the total torque required to start-up rotation of the multi-stage centrifugal compressor 1.

In some embodiments, as shown in FIG. 26, side streams can be provided, in fluid communication with intermediate compressor stages. Side stream arrangements are common in refrigerant compressors for LNG applications. In the schematic of FIG. 26, the main process fluid flow enters the multi-stage centrifugal compressor 1 at the suction side 13, while side streams 34, 35 and 37 are provided in fluid communication with intermediate compressor stages. Side streams 34, 35 are fluidly coupled to stages of the first set 31 of compressor stages, while side stream 37 is fluidly coupled to the suction side of the most upstream one of the stages of the second set 33 of compressor stages. The third side stream flow 37 thus merges with the partly compressed process fluid flowing from an outlet 39 of the first set 31 of compressor stages to an inlet 41 of the second set 33 of compressor stages. The second set of variable inlet guide vanes 18 can thus be used to modulate the flow rate through the side streams.

The reduction of power obtained at start-up of the multi-stage centrifugal compressor 1 results in the possibility of reducing the rated power of an electric motor used to drive the multi-stage centrifugal compressor 1, or in the possibility of reducing the rated power of a starter used in combination with a prime mover, such as a gas turbine engine, the starter and the gas turbine engine forming part of the driver machine.

Figure 27:
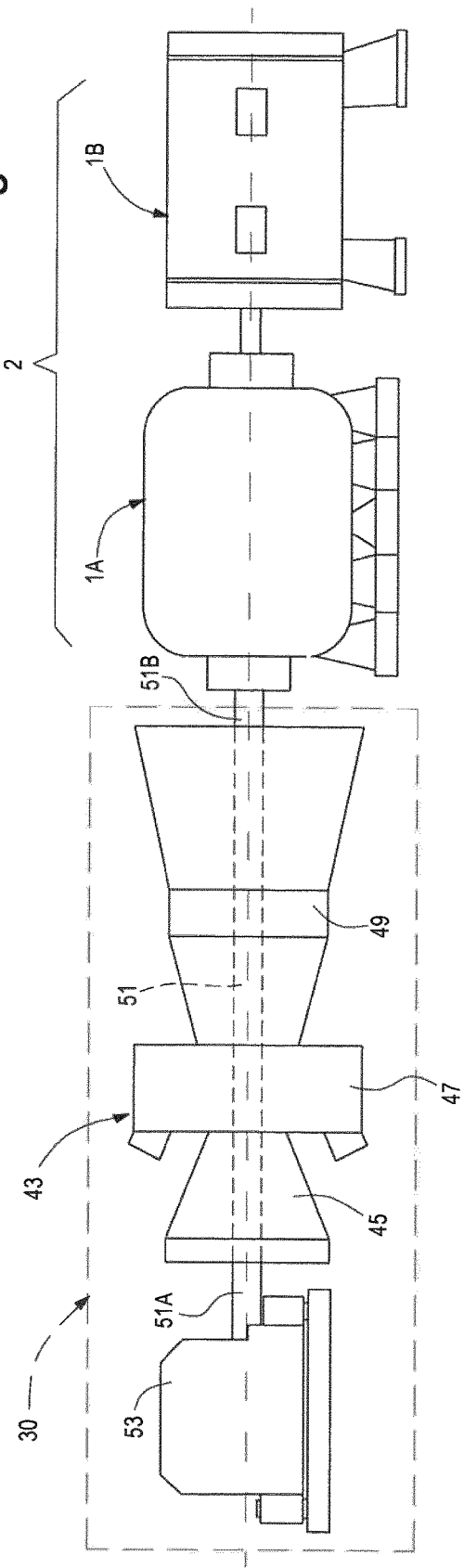
FIG. 27 illustrates an exemplary embodiment of a centrifugal compressor train of an LNG plant, including the driver machine section according to an embodiment.

A lower power rate results in a smaller and less expensive machine, but results in further advantages, which will become more apparent referring to the arrangement of FIG. 27, which shows a further embodiment of a centrifugal compressor arrangement and relevant driver machine.

The system of FIG. 27 comprises a compressor train 2, which by way of example is comprised of a first multi-stage centrifugal compressor 1A and a second multi-stage centrifugal compressor 1B, both driven by a driver machine 30. The two multi-stage centrifugal compressors 1A and 1B can be used to process the same or different process gases. For instance, the compressor train 2 can be part of an LNG refrigeration circuit. In some embodiments the first multi-stage centrifugal compressor 1A can be configured for processing propane and the second multi-stage centrifugal compressor 1B can be configured for processing mixed refrigerant. In other embodiments, the two multi-stage centrifugal compressors can 1A, 1B be configured for processing any one of several possible refrigerant fluids, e.g. selected from the group consisting of methane, ethane, propane, ethylene, nitrogen, ammonia, butane, isobutene, propylene, and combinations thereof. Broadly speaking, any gas belonging to the ASHRAE (American Society of Heating, Refrigerating, and Air-Conditioning Engineers) Standard Designation of Refrigerants can be used.

The multi-stage centrifugal compressors 1A, 1B can be both vertically-split, or both horizontally-split compressors. For instance, compressors 1A, 1B can both be MCL series compressors, or both be BCL series compressors. If one of the two compressors is a vertically split compressor, e.g. a BCL series compressor, in some arrangements, said vertically split compressor will be arranged at the end of the compressor train 2, i.e. opposite the driver machine 30.

The driver machine 30 can be comprised of a gas turbine engine 43. For instance, the gas turbine engine 43 can include a single shaft gas turbine engine 43. The gas turbine engine 43 can be comprised of an air compressor section 45, a combustor section 47 and a turbine section 49. Power generated by the turbine section 49 drives the air compressor section 45 and the compressor train 2.

Reference number 51 schematically designates the single shaft of the gas turbine engine 43. Shaft 51 has a first shaft end 51A at the suction side, or cold side, of the gas turbine engine 43, and a second shaft end 51B at the pressure side, or hot side, of the gas turbine engine 43. Contrary to commonly used configurations of the current art, wherein an electric starter is arranged at the end of the compressor train 2 opposite to the gas turbine engine 43, in the disclosed configurations an electric machine 53 operating as a starter is drivingly coupled to the first end 51A of the shaft 51. The electric machine 53 can be a reversible electric machine, capable of operating selectively in a generator mode or in a motor mode. The electric machine 53 can thus operate as a starter and as a helper when operating in the electric motor mode, or alternatively as an electric generator. The second end 51B of the shaft 51 is drivingly coupled to the compressor train 2.

The same driver machine 30 can be used in combination with the configurations of FIGS. 1 and 26.

By operating upon the IGVs 17 and/or 18 of one or more of the multi-stage centrifugal compressors 1A, 1B at start-up, the gas flow rate through the gas compressor train 2 at start-up is reduced. A smaller amount of power is thus needed, if compared to centrifugal compressor train of the current art, to start the compressor train. Thus, the total power rate of the electric machine 53 can be lower than in plant configurations of the current art.

The electric machine 53 can thus be arranged on the side of the gas turbine engine 43 opposite the compressor train 2, thanks to the reduced mechanical power, which is required to be transmitted through the single shaft 51 across the gas turbine engine 43.

By arranging the starter at the side of the gas turbine engine 43 opposite the compressor train 2, maintenance of the compressor train is made easier. In particular, opening of the vertically split multi-stage centrifugal compressor 1B and access to the interior thereof is less critical and can be obtained without dismantling the line shaft.

While the above described embodiments are specifically referred to LNG applications, innovative features disclosed herein can be embodied also in other systems where similar problems are encountered at compressor start-up.

Additionally, while the above description specifically refers to driver machines including single-shaft gas turbines, advantages can be achieved by the use of variable IGV at start-up also when the driver machine comprises an electric motor. The rated power, size and thus cost of the electric motor can be reduced, if a lower power at start-up is required.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims. Hence, the proper scope of the disclosed innovations should be determined only by the broadest interpretation of the appended claims so as to encompass all such modifications, changes, and omissions.

In addition, the order or sequence of any process or method steps may be varied or re-sequenced according to alternative embodiments.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A gas compressor train comprising:
   a centrifugal compressor comprised of a compressor inlet, a compressor outlet, a plurality of compressor stages including two intermediate compressor stages, sequentially arranged between the compressor inlet and the compressor outlet, and at least a first set of variable inlet guide vanes at an inlet of a first one of the compressor stages;
   a driver machine drivingly coupled to the centrifugal compressor;
   a controller configured to control the opening and closing of the set of variable inlet guide vanes, wherein prior to start-up and acceleration of the centrifugal compressor, the controller is configured to at least partly close the first set of variable inlet guide vanes, and during the start-up and acceleration of the centrifugal compressor, with the first set of variable inlet guide vanes at least partly closed, the controller is further configured to open the first set of variable inlet guide vanes to increase gas flow through the centrifugal compressor once a predetermined minimum operating speed has been achieved;
   a bleeding line to bleed a portion of the gas flowing from a delivery side of one of the compressor stages and return the bled gas to an inlet of another of the compressor stages upstream of the delivery side when starting rotation of the centrifugal compressor and accelerating the centrifugal compressor up to the predetermined minimum operating speed; and
   a first side stream, a second side steam and a third side stream,
   wherein the plurality of compressor stages of the centrifugal compressor comprises a first set of compressor stages including the two intermediate compressor stages, and a second set of compressor stages, the first set of compressor stages arranged in a back-to-back configuration relative to the second set of compressor stages, and
   wherein the first side stream and the second side stream are fluidly coupled to a respective one of the two intermediate compressor stages in the first set of compressor stages, and the third side steam is fluidly coupled to a compressor stage of the second set of compressor stages, said compressor stage of the second set of compressor stages being the most upstream compressor stage in the second set of compressor stages, the third side stream configured to merge with a partly compressed process fluid from an outlet of the first set of compressor stages to form a merged stream, the merged stream fluidly coupled to an inlet of the second set of compressor stages.

2. The gas compressor train of claim 1, wherein the first set of variable inlet guide vanes is arranged at the inlet of a most upstream compressor stage of the centrifugal compressor.

3. The gas compressor train of claim 1, wherein the driver machine comprises an arrangement comprising a single-shaft gas turbine engine and a starter drivingly coupled to the single-shaft gas turbine engine, the arrangement configured to apply power generated by the starter to the centrifugal compressor during the start-up and acceleration of the centrifugal compressor.

4. The gas compressor train of claim 3, wherein the starter is one of an electric motor and a steam turbine.

5. The gas compressor train of claim 3, wherein the starter is drivingly coupled to a first end of the single-shaft gas turbine engine and the centrifugal compressor is drivingly coupled to a second end of the single-shaft gas turbine engine.

6. The gas compressor train of claim 3, wherein the starter is an electric motor and the predetermined minimum operating speed is a speed of synchronization of the electric motor to an electric grid frequency.

7. The gas compressor train of claim 1, wherein the bleeding line is arranged between the delivery side of said one of the compressor stages and the inlet of said another of the compressor stages.

8. The gas compressor train of claim 7, wherein an outlet of the bleeding line is connected to an inlet of the most upstream stage of the plurality of compressor stages.

9. The gas compressor train of claim 1, further comprising a second set of variable inlet guide vanes configured to modulate a flow rate of fluids respectively flowing through the first side stream, the second side stream, and the third side stream.

10. The gas compressor train of claim 9, wherein the second set of variable inlet guide vanes is arranged at an inlet of one of the respective compressor stages of the second set of compressor stages.

* * * * *